(12) United States Patent
Wang et al.

(10) Patent No.: US 12,361,027 B2
(45) Date of Patent: Jul. 15, 2025

(54) ITERATIVE SAMPLING BASED DATASET CLUSTERING

(71) Applicant: Microsoft Technology Licensing, LLC, Redmond, WA (US)

(72) Inventors: Shean Wang, Sammamish, WA (US); Jiayuan Huang, Medina, WA (US); Weizhu Chen, Kirkland, WA (US); Changhong Yuan, Sammamish, WA (US); Ankit Saraf, Bellevue, WA (US); Xiaoying Guo, Sammamish, WA (US); Eslam K. Abdelreheem, Sammamish, WA (US); Yunjing Ma, Bellevue, WA (US); Yuantao Wang, Sammamish, WA (US); Justin Carl Wong, Seattle, WA (US); Nan Zhao, Sammamish, WA (US); Chao Li, Kirkland, WA (US); Tsuyoshi Watanabe, Bothell, WA (US); Jaclyn Ruth Elizabeth Phillips, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 16/659,017

(22) Filed: Oct. 21, 2019

(65) Prior Publication Data
US 2021/0117448 A1    Apr. 22, 2021

(51) Int. Cl.
G06F 7/00    (2006.01)
G06F 16/00    (2019.01)
G06F 16/28    (2019.01)

(52) U.S. Cl.
CPC .................. G06F 16/285 (2019.01)

(58) Field of Classification Search
CPC .............................. G06F 16/285; G06F 40/20
See application file for complete search history.

(56) References Cited

U.S. PATENT DOCUMENTS 8,225,190 B1    7/2012  Bharat et al.
8,949,237 B2 *  2/2015  Balcan ................ G06F 16/9535
                                                            707/748

(Continued)

FOREIGN PATENT DOCUMENTS

CN    104462286 A    3/2015

OTHER PUBLICATIONS

Hopke, et al., "The Use of Sampling to Cluster Large Data Sets", In Journal of Chemometrics and Intelligent Laboratory Systems, vol. 8, Issue 2, Jun. 1, 1990, pp. 195-204.

(Continued)

*Primary Examiner* — Tuan A Pham
(74) *Attorney, Agent, or Firm* — Workman Nyedgger

(57) ABSTRACT

In some examples, iterative sampling based dataset clustering may include sampling a dataset that includes a plurality of items to identify a specified number of sampled items. The sampled items may be clustered to generate a plurality of clusters. Un-sampled items may be assigned from the plurality of items to the clusters. Remaining un-sampled items that are not assigned to the clusters may be identified. A ratio associated with the remaining un-sampled items and the plurality of items may be compared to a specified threshold. Based on a determination that the ratio is greater than the specified threshold, an indication of completion of clustering of the plurality of items may be generated.

18 Claims, 18 Drawing Sheets

(56) References Cited

U.S. PATENT DOCUMENTS

| | | |
|---|---|---|
| 9,195,635 B2 | 11/2015 | Liu et al. |
| 9,449,080 B1 | 9/2016 | Zhang |
| 9,836,183 B1* | 12/2017 | Love ................ G06F 16/904 |
| 10,169,330 B2 | 1/2019 | Misra et al. |
| 11,921,687 B2* | 3/2024 | Wick ............... G06F 16/2228 |
| 2009/0043797 A1* | 2/2009 | Dorie ............... G06F 16/355 |
| | | 707/999.102 |
| 2011/0035379 A1* | 2/2011 | Chen ............... G06F 16/2462 |
| | | 707/769 |
| 2013/0097103 A1* | 4/2013 | Chari ................ G06N 20/10 |
| | | 707/E17.089 |
| 2014/0201208 A1* | 7/2014 | Satish .............. G06F 21/564 |
| | | 707/737 |
| 2014/0229307 A1* | 8/2014 | Kallumadi ......... G06Q 30/0601 |
| | | 705/26.1 |
| 2015/0134660 A1* | 5/2015 | Yan .................. G06F 16/285 |
| | | 707/737 |
| 2015/0248476 A1 | 9/2015 | Weissinger et al. |
| 2016/0048579 A1* | 2/2016 | Hall ................. G06F 18/214 |
| | | 707/737 |
| 2016/0103842 A1* | 4/2016 | Choromanski ......... G06F 18/28 |
| | | 707/737 |
| 2016/0364421 A1* | 12/2016 | Huang ............. G06F 16/2246 |
| 2017/0243137 A1 | 8/2017 | Mandel et al. |
| 2018/0082183 A1* | 3/2018 | Hertz ................ G06Q 10/10 |
| 2018/0336207 A1* | 11/2018 | Dunne ............... G06F 16/35 |

OTHER PUBLICATIONS

Sayyadi, et al., "A Graph Analytical Approach for Topic Detection", In Journal of ACM Transactions on Internet Technology, vol. 13, Issue 2, Dec. 1, 2013, 23 Pages.

Xu, et al., "Topic Discovery for Streaming Short Texts with CTM", In Proceedings of International Joint Conference on Neural Networks, Jul. 8, 2018, 7 Pages.

* cited by examiner

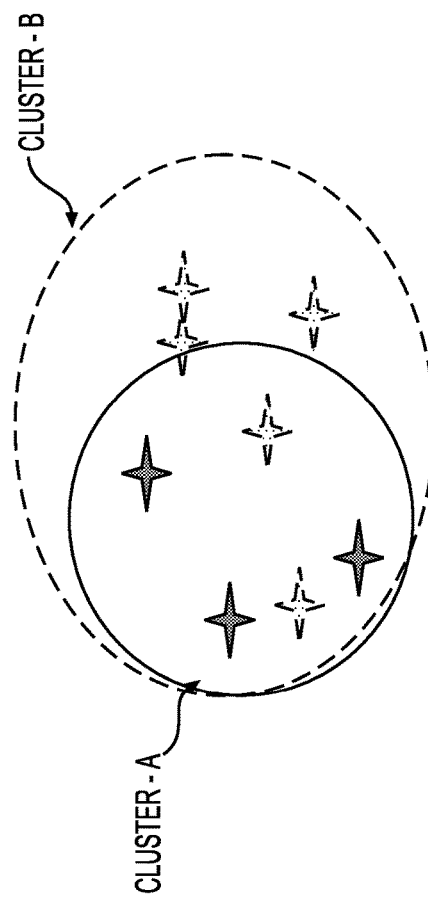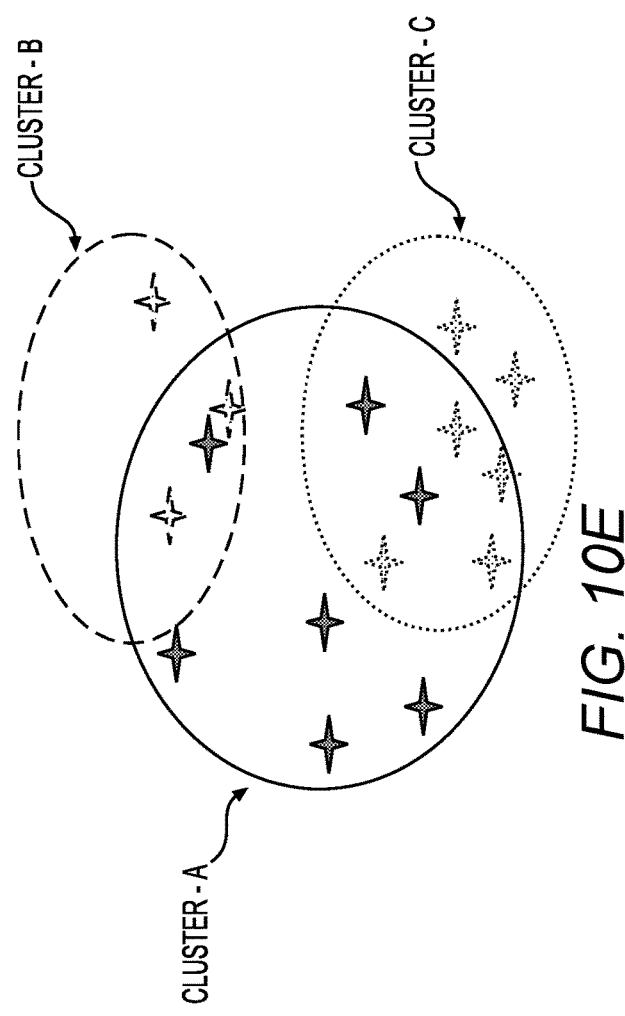

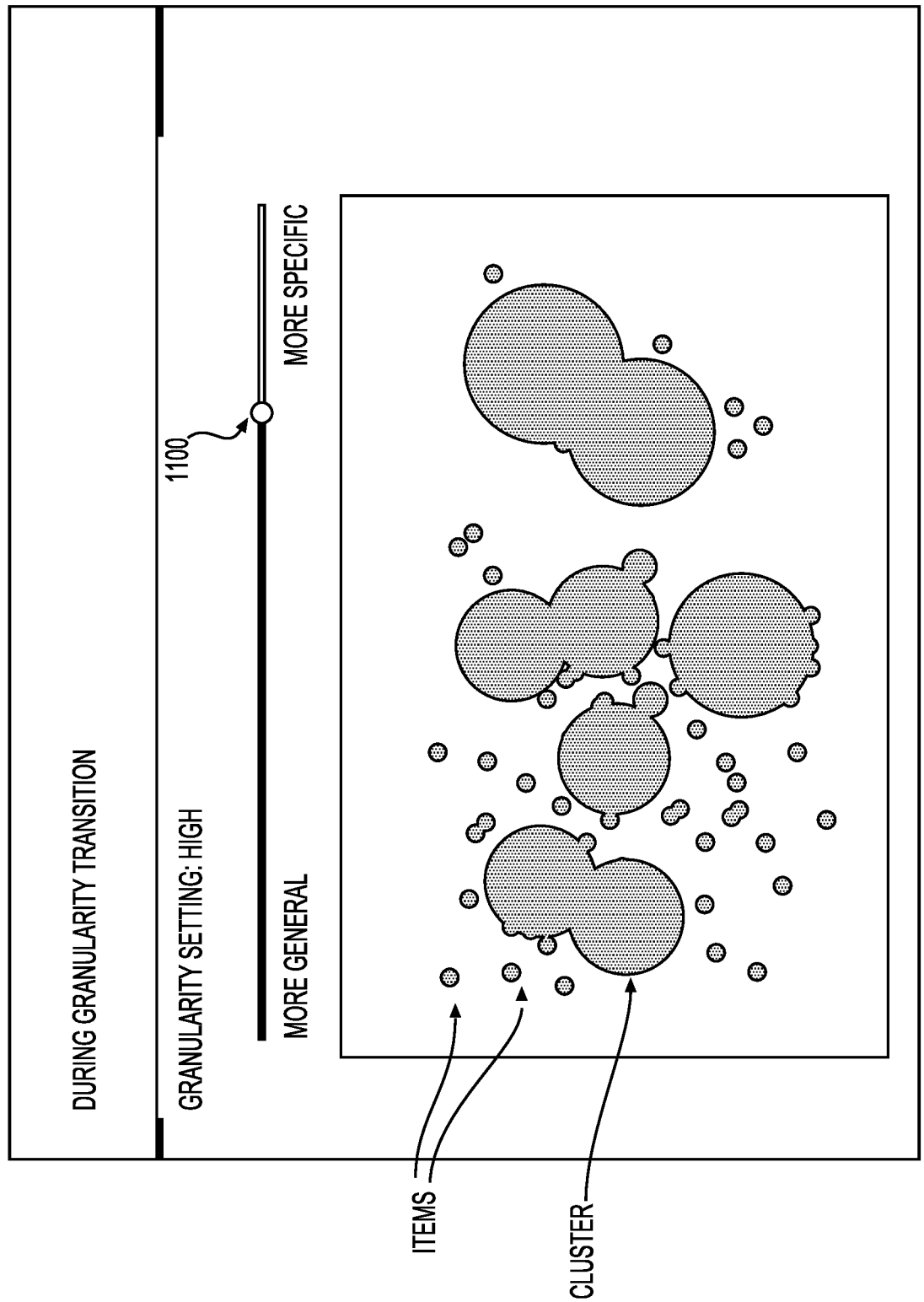

1300

```
┌─────────────────────────────────────────────────────────────────┐
│  SAMPLE A DATASET THAT INCLUDES A PLURALITY OF ITEMS TO         │
│         IDENTIFY A SPECIFIED NUMBER OF SAMPLED ITEMS            │
│                              1302                                │
└─────────────────────────────────────────────────────────────────┘
                                 ▼
┌─────────────────────────────────────────────────────────────────┐
│      CLUSTER THE SAMPLED ITEMS TO GENERATE A PLURALITY OF       │
│                            CLUSTERS                              │
│                              1304                                │
└─────────────────────────────────────────────────────────────────┘
                                 ▼
┌─────────────────────────────────────────────────────────────────┐
│   PERFORM ASSIGNMENT OF UN-SAMPLED ITEMS FROM THE PLURALITY     │
│               OF ITEMS TO THE CLUSTERS                           │
│                              1306                                │
└─────────────────────────────────────────────────────────────────┘
                                 ▼
┌─────────────────────────────────────────────────────────────────┐
│ IDENTIFY, BASED ON THE PERFORMANCE OF ASSIGNMENT OF THE UN-     │
│ SAMPLED ITEMS TO THE CLUSTERS, REMAINING UN-SAMPLED ITEMS       │
│          THAT ARE NOT ASSIGNED TO THE CLUSTERS                   │
│                              1308                                │
└─────────────────────────────────────────────────────────────────┘
                                 ▼
┌─────────────────────────────────────────────────────────────────┐
│   COMPARE A RATIO ASSOCIATED WITH THE REMAINING UN-SAMPLED      │
│   ITEMS AND THE PLURALITY OF ITEMS TO A SPECIFIED THRESHOLD     │
│                              1310                                │
└─────────────────────────────────────────────────────────────────┘
                                 ▼
┌─────────────────────────────────────────────────────────────────┐
│   BASED ON A DETERMINATION THAT THE RATIO IS LESS THAN OR       │
│   EQUAL TO THE SPECIFIED THRESHOLD, FURTHER SAMPLE THE          │
│ REMAINING UN-SAMPLED ITEMS TO IDENTIFY A FURTHER SPECIFIED      │
│                    NUMBER OF SAMPLED ITEMS                       │
│                              1312                                │
└─────────────────────────────────────────────────────────────────┘
                                 ▼
┌─────────────────────────────────────────────────────────────────┐
│    CLUSTER THE FURTHER SAMPLED ITEMS TO GENERATE A FURTHER      │
│                      PLURALITY OF CLUSTERS                       │
│                              1314                                │
└─────────────────────────────────────────────────────────────────┘
```

ITERATIVE SAMPLING BASED DATASET CLUSTERING

BACKGROUND

A dataset may include a plurality of items. For example, a dataset may include on the order of hundreds of thousands, or a significantly higher magnitude of items. Examples of items may include documents, cases represented using natural language text, etc. In some examples, the items may need to be clustered to organize contents of the dataset. Factors such as a number of the items may impact a time needed to complete a clustering operation. The time needed to complete the clustering operation may directly impact downstream processes such as implementation of real-time virtual assistance, implementation of mitigation procedures to prevent system breach, etc.

BRIEF DESCRIPTION OF DRAWINGS

Features of the present disclosure are illustrated by way of example and not limited in the following figure(s), in which like numerals indicate like elements, in which:

FIGS. 10A-10E illustrate transfer of topics to illustrate operation of the iterative sampling based dataset clustering apparatus of FIG. 1 in accordance with an embodiment of the present disclosure;

FIGS. 11A-11C illustrate clustering granularity selection to illustrate operation of the iterative sampling based dataset clustering apparatus of FIG. 1 in accordance with an embodiment of the present disclosure;

FIG. 13 illustrates a flowchart of an example method for iterative sampling based dataset clustering in accordance with an embodiment of the present disclosure.

DETAILED DESCRIPTION

Figure 1:
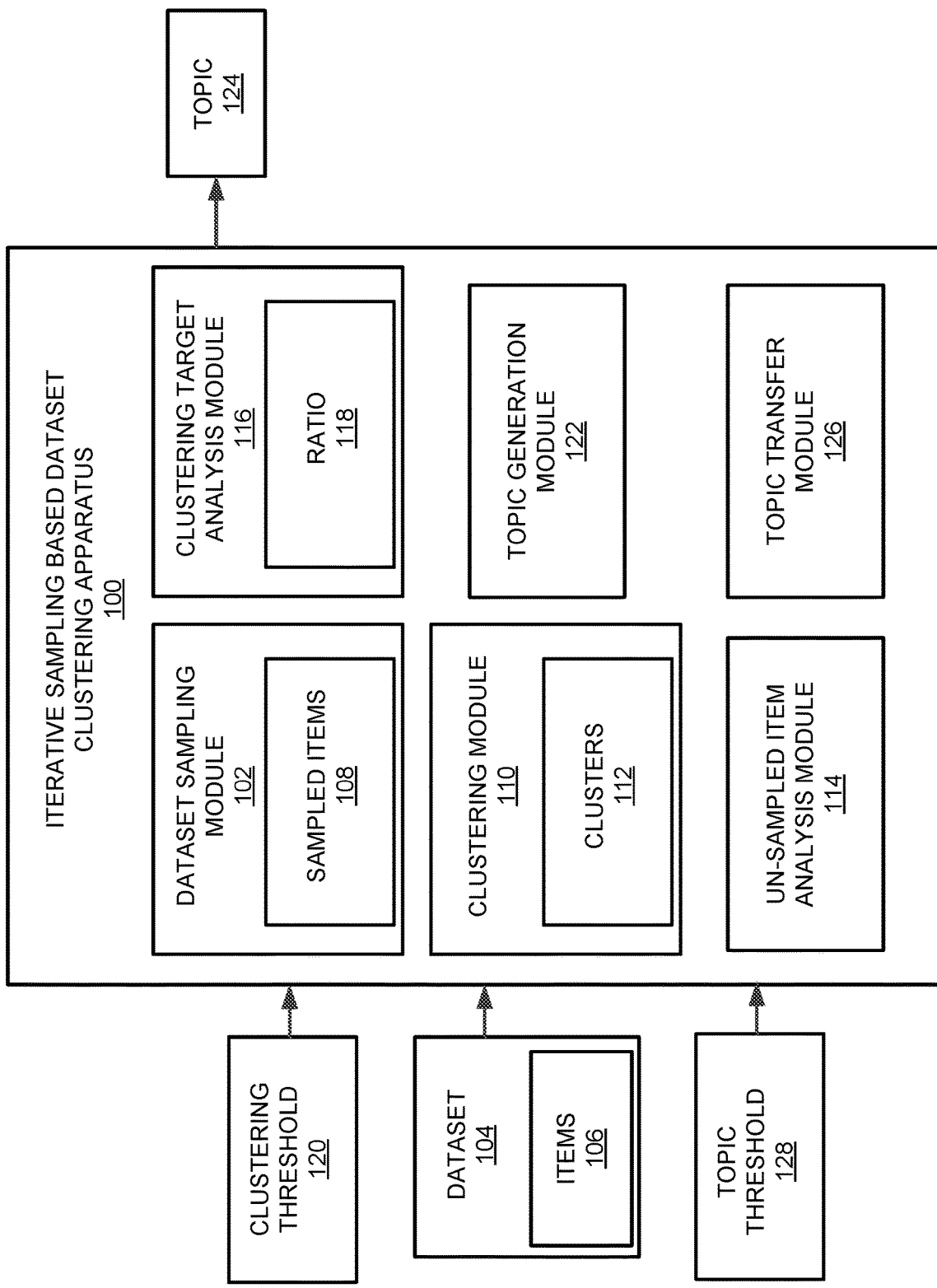
FIG. 1 illustrates a layout of an iterative sampling based dataset clustering apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Iterative sampling based dataset clustering apparatuses, methods for iterative sampling based dataset clustering, and non-transitory computer readable media having stored thereon machine readable instructions to provide iterative sampling based dataset clustering are disclosed herein. The apparatuses, methods, and non-transitory computer readable media disclosed herein provide for clustering of a plurality of items of a dataset while achieving linear computational complexity based on utilization of a fixed sample size that is independent of a number of the items of the dataset. In this regard, the apparatuses, methods, and non-transitory computer readable media disclosed herein provide for the iterative generation of clusters until a ratio associated with un-sampled items from a dataset is greater than a specified threshold (e.g., a relatively small percentage of items of the dataset remain unassigned to clusters). The apparatuses, methods, and non-transitory computer readable media disclosed herein also provide for the generation of a topic for each of the clusters. Yet further, the apparatuses, methods, and non-transitory computer readable media disclosed herein provide for the transfer of a topic from an original cluster to a new cluster based on an analysis of a number of intersected points between the original cluster and the new cluster.

With respect to clustering of a plurality of items of a dataset, various clustering techniques may be utilized to cluster the items of the dataset. Such clustering techniques may include a nonlinear computational complexity, which may thus result in an unacceptably long time needed for clustering of the items of the dataset. In this regard, it is technically challenging to reduce the computational complexity associated with clustering, and thus the time needed for clustering of the items of a dataset.

In order to address the aforementioned technical challenges with respect to clustering of a plurality of items of a dataset, the apparatuses, methods, and non-transitory computer readable media disclosed herein provide a clustering technique that achieves linear computational complexity based on utilization of a fixed sample size that is independent of a number of items of a dataset. In this regard, the clustering as disclosed herein may scale linearly, irrespective of a number of items in the dataset. For example, irrespective of whether a dataset includes on the order of a hundred thousand or a million items, the clustering as disclosed herein may scale linearly based on the utilization of a fixed sample size. For example, the sample size may be specified as a fixed number such as five thousand items (or another number specified for the clustering). In this manner, a majority of relevant items may be clustered in a minimal number of iterations (e.g., one to three iterations) as disclosed herein, which may reduce the time needed to complete the overall clustering operation. The topics that are generated from the clustering may be utilized to implement, as disclosed herein, downstream processes such as implementation of real-time virtual assistance, implementation of mitigation procedures to prevent system breach, etc.

With respect to generation of a topic for each of the clusters, an example of application of the apparatuses, methods, and non-transitory computer readable media disclosed herein may include a customer support service system that deals with a relatively large amount of support traffic reported from consumers and support agents. In this regard, the support traffic may include issues reported from many channels in various forms, such as email, phone calls, support agent conversations from web/mobile devices, etc. All of these forms may include natural languages expressed in structured, semi-structured, or unstructured formats. In this regard, it is technically challenging to identify relevant topics across all channels in an efficient and timely manner.

In order to address the aforementioned technical challenges with respect to identification of relevant topics in an efficient and timely manner, the apparatuses, methods, and non-transitory computer readable media disclosed herein provide for clustering of a plurality of items of a dataset while achieving linear computational complexity. For each of the clusters that is generated, a topic may be identified on a real-time basis, and with relatively low latency associated with processing of the dataset. The topics may be specified in a canonical manner, based, for example, on user feedback.

With respect to transfer of a topic from an original cluster to a new cluster, when items for a new dataset are analyzed to generate new clusters, a new cluster may include items that are somewhat similar to items of an original cluster. In this regard, it is technically challenging to determine whether to utilize the same or different topics for such clusters that may include items that are somewhat similar.

In order to address the aforementioned technical challenges with respect to transfer of a topic from an original cluster to a new cluster, the apparatuses, methods, and non-transitory computer readable media disclosed herein provide for transfer of a topic from an original cluster to a new cluster based on an analysis of a number of intersected points between the original cluster and the new cluster. For example, if an intersection over union associated with the number of intersected points between the original cluster and the new cluster exceeds a specified threshold, then the topic of the original cluster may be transferred to the new cluster, and otherwise the two clusters may be assigned different topics.

According to examples disclosed herein, the apparatuses, methods, and non-transitory computer readable media disclosed herein may provide for the selection of different topic clustering granularity. In this regard, topic clustering granularity may be selected to generate clusters that are less specific (e.g., include low granularity) or clusters that are more specific (e.g., include high granularity).

According to examples disclosed herein, the apparatuses, methods, and non-transitory computer readable media disclosed herein may provide for assessment of feedback to modify clustering results to converge into an expected topic distribution, and for attainment of increased clustering and topic generation accuracy.

According to examples disclosed herein, the apparatuses, methods, and non-transitory computer readable media disclosed herein may utilize the generated topics to make recommendations, for example, for customer support. For example, the topics may represent the basis for automation (e.g., implementation without human intervention) of customer support. For example, topics associated with high traffic may be identified for generation of responses, for example, by a virtual agent. Alternatively or additionally, certain topics (e.g., "active virus") may be identified for implementation of procedures to prevent system infiltration, for example, by shutting down a system or otherwise implementing a firewall or other such procedures. In this regard, rules may be utilized to analyze the topics to identify certain topics, where once a topic is identified, operation of a system (e.g., a system that includes a server or other such computer equipment) may be controlled, for example, by shutting down the system or otherwise implementing a firewall or other such procedures.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example iterative sampling based dataset clustering apparatus (hereinafter also referred to as "apparatus 100").

Referring to FIG. 1, the apparatus 100 may include a dataset sampling module 102 to sample a dataset 104 that includes a plurality of items 106 to identify a specified number of sampled items 108. For example, the dataset sampling module 102 may randomly sample the dataset 104 that includes the plurality of items 106 to identify the specified number of sampled items 108.

According to examples disclosed herein, a sample size associated with the sampling of the dataset 104 may be a fixed number that is independent of a number of the plurality of items 106. For example, the sample size may be specified at five thousand samples (or another fixed number).

A clustering module 110 may cluster the sampled items 108 to generate a plurality of clusters 112. For example, the clustering module 110 may utilize clustering techniques such as k-means clustering, hierarchical clustering, density-based clustering, etc., to generate the plurality of clusters 112. In this regard, the clustering module 110 may utilize sentence embedding from a deep neural network (or other such techniques) to convert items to vectors for the clustering operation. The clustering module 110 may perform assignment of un-sampled items from the plurality of items 106 to the clusters 112.

An un-sampled item analysis module 114 may identify, based on the performance of assignment of the un-sampled items to the clusters 112, remaining un-sampled items that are not assigned to the clusters 112.

A clustering target analysis module 116 may compare a ratio 118 associated with the remaining un-sampled items and the plurality of items 106 to a specified clustering threshold 120. According to examples disclosed herein, the clustering target analysis module 116 may determine the ratio 118 by dividing a value determined by subtracting the remaining un-sampled items from the plurality of items 106, by the plurality of items 106.

Based on a determination that the ratio 118 is greater than the specified clustering threshold 120, the clustering target analysis module 116 may generate an indication of completion of clustering of the plurality of items 106.

Alternatively, based on a determination that the ratio 118 is less than or equal to the specified clustering threshold 120, the dataset sampling module 102 may further sample the remaining un-sampled items to identify a further specified number of sampled items. The clustering module 110 may cluster the further sampled items to generate a further plurality of clusters. The clustering module 110 may perform assignment of further un-sampled items from the remaining un-sampled items to all of the clusters. The un-sampled item analysis module 114 may identify, based on the performance of assignment of the further un-sampled items to all of the clusters, further remaining un-sampled items that are not assigned to the clusters. The clustering target analysis module 116 may compare a further ratio associated with the further remaining un-sampled items and the plurality of items 106 to the specified clustering threshold 120. Based on a determination that the further ratio is greater than the specified clustering threshold 120, the clustering target analysis module 116 may generate the indication of completion of clustering of the plurality of items 106.

Thus, the clustering module 110 may iteratively generate additional clusters and perform assignment of additional un-sampled items to all of the clusters until a final ratio associated with additional remaining un-sampled items is greater than the specified clustering threshold 120.

For each cluster of the plurality of clusters, a topic generation module 122 may separate each item assigned to the cluster into at least one sentence. For each sentence, the topic generation module 122 may identify at least one noun phrase. The topic generation module 122 may rank noun phrases according to a term frequency measure. The topic generation module 122 may identify, from the ranked noun phrases, a specified number of highest ranked noun phrases. Further, the topic generation module 122 may utilize the highest ranked noun phrases with a deep neural network model to identify a topic 124 of the cluster.

A topic transfer module 126 may identify a topic for each cluster of the plurality of clusters. Each cluster of the plurality of clusters may be designated an original cluster. For a new cluster that is generated after generation of the plurality of clusters, the topic transfer module 126 may compare each cluster of the plurality of clusters to the new cluster to identify a most similar cluster pair. The topic transfer module 126 may count a number of intersected points between clusters of the cluster pair. If an intersection over union based on the intersected points exceeds a specified topic threshold 128, the topic transfer module 126 may transfer the topic of the original cluster from the cluster pair to the new cluster.

Operation of the apparatus 100 is described in further detail with reference to FIGS. 1-11C.

Figure 2:
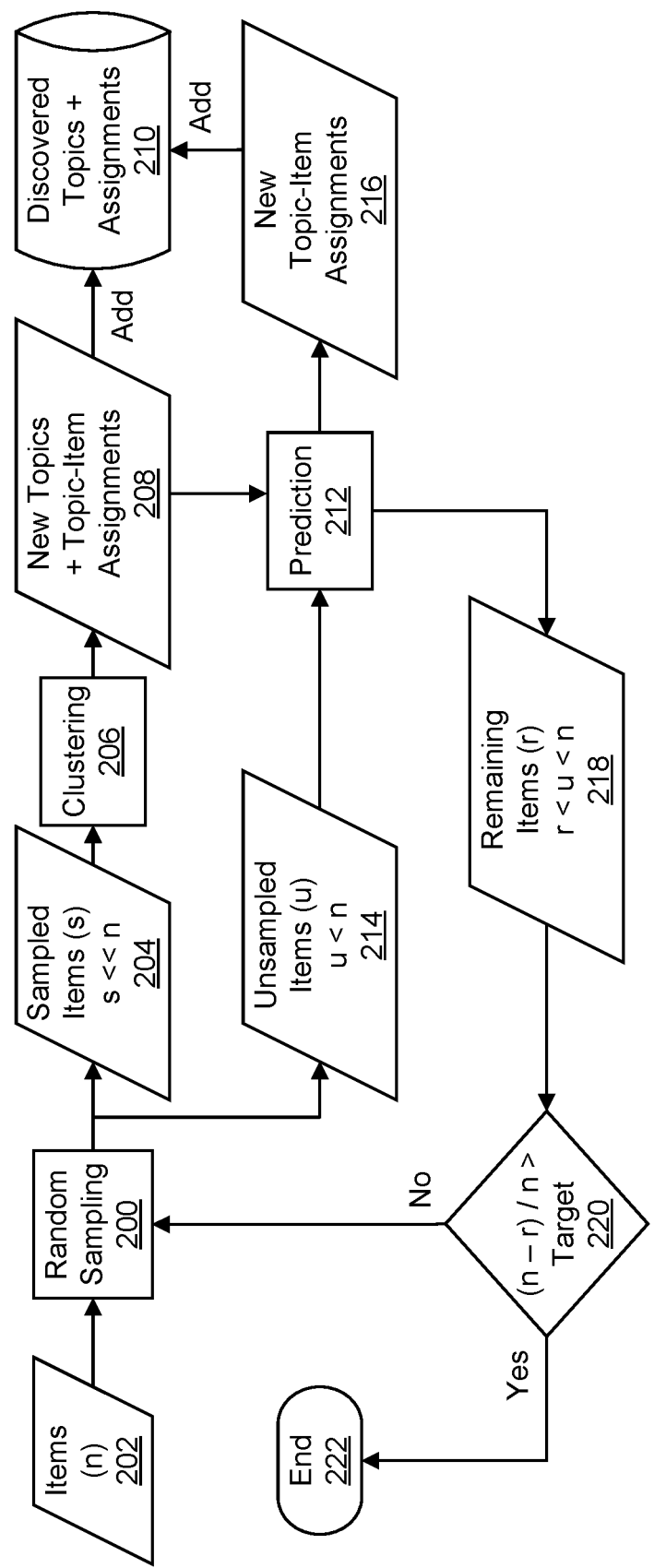
FIG. 2 illustrates a logical flow to illustrate a clustering operation of the iterative sampling based dataset clustering apparatus of FIG. 1 in accordance with an embodiment of the present disclosure.

FIG. 2 illustrates a logical flow to illustrate a clustering operation of the apparatus 100 in accordance with an embodiment of the present disclosure.

Referring to FIG. 2, for a first iteration of the clustering operation, at 200, the dataset sampling module 102 may randomly sample, from 202, a dataset 104 that includes a plurality of items 106 to identify, at 204, a specified number of sampled items 108. For example, the items 106 may be represented as (n), and the sampled items 108 may be represented as (s).

At 206, the clustering module 110 may cluster the sampled items 108 to generate a plurality of clusters 112.

At 208, the topic generation module 122 may identify a topic 124 of each of the clusters 112.

At 210, the discovered topics and assignments of the sampled items from the plurality of items 106 to the clusters 112 may be stored, for example, in a database, or another environment (e.g., a Cloud environment, or another such environment).

At 212, the clustering module 110 may perform assignment of un-sampled items (e.g., from 214) from the plurality of items 106 to the clusters 112 (e.g., at 216). In this regard, the un-sampled item analysis module 114 may identify, based on the performance of assignment of the un-sampled items (e.g., from 214 to 216) to the clusters 112, remaining un-sampled items (e.g., at 218) that are not assigned to the clusters 112. In this regard, the un-sampled items at 214 may be designated as (u), and the remaining un-sampled items at 218 may be designated as (r).

At 220, the clustering target analysis module 116 may compare a ratio 118 associated with the remaining un-sampled items and the plurality of items 106 to a specified clustering threshold 120. For example, the clustering target analysis module 116 may determine the ratio 118 by dividing a value determined by subtracting the remaining un-sampled items from the plurality of items 106, by the plurality of items 106 (e.g., ratio=((n−R)/n)).

At 222, based on a determination that the ratio 118 is greater than the specified clustering threshold 120, the clustering target analysis module 116 may generate an indication of completion of clustering of the plurality of items 106. For example, the specified clustering threshold 120 may be specified as 70%.

Alternatively, based on a determination that the ratio 118 is less than or equal to the specified clustering threshold 120 (e.g., the ratio 118 is 50%, which is less than or equal to the specified clustering threshold 120 of 70%), for a second iteration of the clustering operation, at 200, the dataset sampling module 102 may further sample the remaining un-sampled items (e.g., r) to identify a further specified number of sampled items. The clustering module 110 may cluster the further sampled items to generate a further plurality of clusters (e.g., at 204, 206, and 208). The clustering module 110 may perform assignment of further un-sampled items from the remaining un-sampled items to all of the clusters (e.g., at 210, 212, 214, and 216, where all of the clusters may include the clusters from the first and the second iterations of the clustering operation). The un-sampled item analysis module 114 may identify, based on the performance of assignment of the further un-sampled items to all of the clusters, further remaining un-sampled items that are not assigned to the clusters (e.g., at 218). The clustering target analysis module 116 may compare a further ratio associated with the further remaining un-sampled items and the plurality of items 106 to the specified clustering threshold 120 (e.g., at 220). Based on a determination that the further ratio is greater than the specified clustering threshold 120, the clustering target analysis module 116 may generate the indication of completion of clustering of the plurality of items 106 (e.g., at 222). Thus, the clustering module 110 may iteratively generate (e.g. based on the first, second, and any further iterations) additional clusters and perform assignment of additional un-sampled items to all of the clusters until a final ratio (e.g., at 220) associated with additional remaining un-sampled items is greater than the specified clustering threshold 120.

Figure 3:
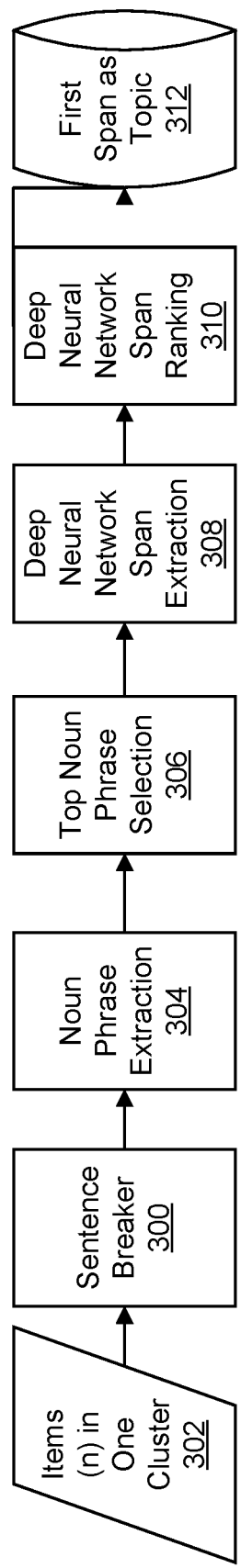
FIG. 3 illustrates a logical flow to illustrate a topic generation operation of the iterative sampling based dataset clustering apparatus of FIG. 1 in accordance with an embodiment of the present disclosure.

FIG. 3 illustrates a logical flow to illustrate a topic generation operation of the apparatus 100 in accordance with an embodiment of the present disclosure.

Referring to FIG. 3, at 300, the topic generation module 122 may separate each item assigned to the cluster (e.g., at 302) into at least one sentence.

At 304, for each sentence, the topic generation module 122 may identify at least one noun phrase. In this regard, the topic generation module 122 may identify noun phrases in the sentence set from block 302.

At 306, the topic generation module 122 may rank noun phrases according to a term frequency measure. For example, at 306, the topic generation module 122 may rank noun phrases based, for example, on term frequency-inverse document frequency (TF-IDF), and use top noun phrases as seeds of a next span extraction model. The top N noun phrases may represent the best ranked noun phrases according to a TF-IDF score. In this regard, the computation of TF-IDF may utilize the clustered items and topics to determine the IDF. The top N extracted noun phrases may be used as training data to train the span extraction model. After training, the span extraction model may be used on each item independently without the need for all of the clustered items. With that, the top N noun phrase extraction may be utilized once at initial training time in an offline mode, and without the need for user-specific data. Thereafter, the span extraction model may be utilized at system runtime. The number of noun phrases may be configurable (e.g., top two noun phrases). For example, for each topic, the top two noun phrases may be selected based on TF-IDF, and then sent to the next span extraction model.

At 308, the topic generation module 122 may extract key spans from sentences with a deep neural network model, using the seeds from block 306. For the span extraction model, several items may be labeled with respect to best spans mapping data to train the deep neural network model. The span extraction model may be used to predict the best start and end positions in each item which include the noun phrase seed, and then the start-to-end span may be used to represent the whole item sentence. The deep neural network model may provide a confirmation that the span selected is both concise and the best representative of the original item concept. For example, if "gift card" is selected as a top noun phrase in one cluster, given one item (e.g., case) of "user asking if they can return the store gift card for cash after three months", the span extraction model may select the best start position for this item (e.g., case) as "return" and the best end position as "cash", and then use "return the store gift card for cash" to represent this item concept. Furthermore, the span extraction model may extract multiple spans in one item (e.g., case) if it has several sentences, and each sentence may include a different concept which includes the noun phrase.

At 310, the topic generation module 122 may rank extracted spans with the deep neural network model. In this regard, after the span extraction model has extracted different spans in one topic, a deep neural network model may be used to rank the best span to represent the topic. In this regard, given one span, the deep neural network model may determine an average similarity score from the span to all items in this topic. Thereafter, all of the spans may be ranked by similarity score, and the highest similarity score span may be selected as a final topic. A similarity model may be trained by some labeled data which has a higher score for semantically similar sentences and a lower score for sentences that are not semantically similar. For example, one topic may include three items (e.g., cases) such as "user wants to add gift card for a placed order when checkout", "user wants to add gift card at checkout but can't find the gift card submit button" and "user has difficulty to add multiple gift cards at checkout". In this regard, the span extraction model may extract three spans from these items (e.g., cases) as "add gift card", "add gift card at checkout" and "add multiple gift cards at checkout". The similarity model may determine the similarity score for each span. For one span such as "add gift card", the similarity model may determine similarity score from this span for all original three items, and then determine an average score as a final score. Once all of the spans' scores are determined, the scores may be ranked from highest to lowest to select the best representative. For this example, the span "add gift card at checkout" may include the highest score since it has more information, and all of the information is related to each original item. Thus, the topic may be specified as "add gift card at checkout".

At 312, the topic generation module 122 may use a top score span as a final topic. Thus, the topic generation module 122 may identify, from the ranked noun phrases, a specified number of highest ranked noun phrases, and may utilize the highest ranked noun phrases with the deep neural network model to identify a topic 124 of the cluster.

Figure 4:
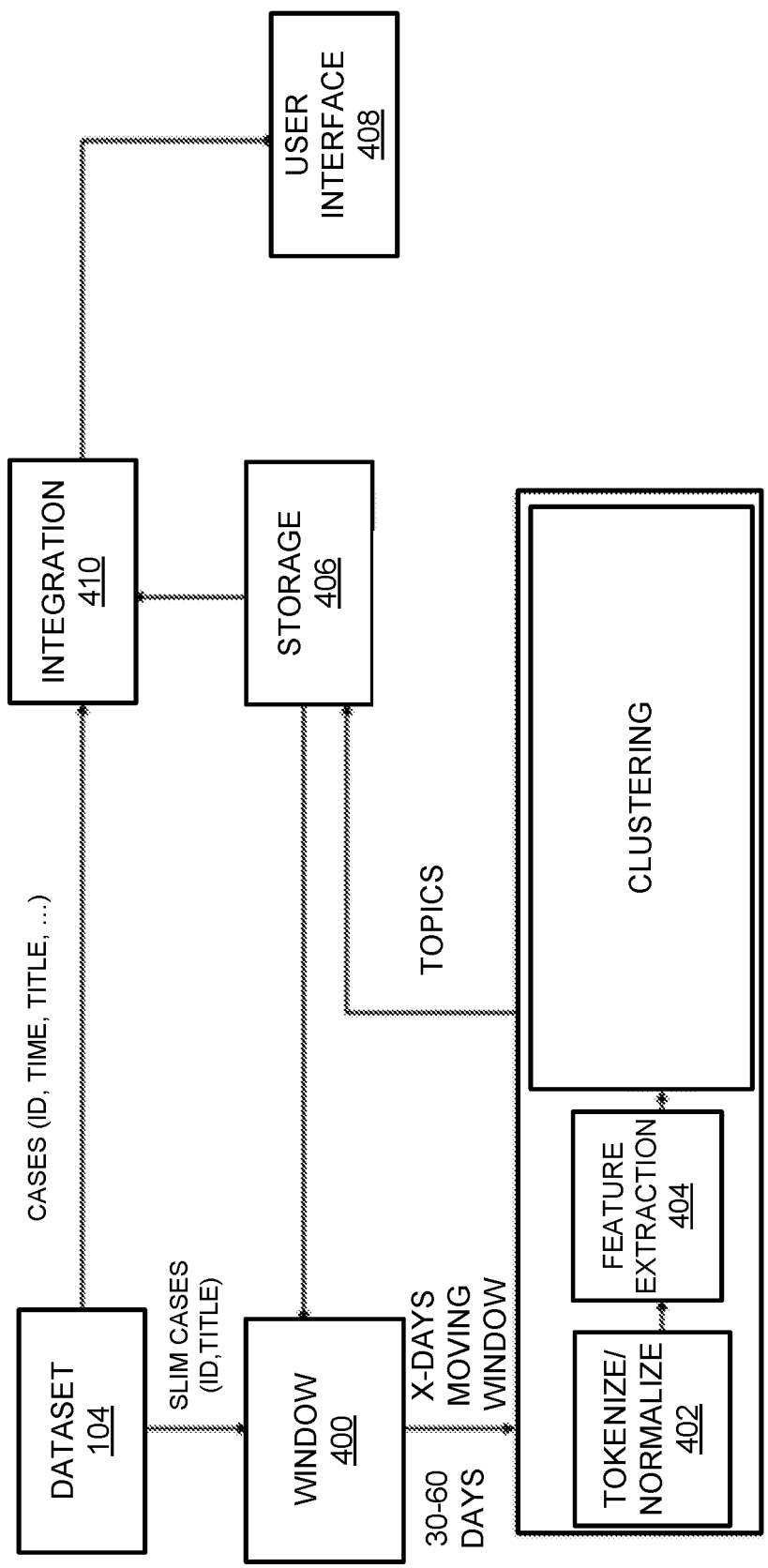
FIG. 4 illustrates further details of the architectural layout of the iterative sampling based dataset clustering apparatus of FIG. 1 in accordance with an embodiment of the present disclosure.

FIG. 4 illustrates further details of the architectural layout of the apparatus 100 in accordance with an embodiment of the present disclosure.

Referring to FIG. 4, the dataset 104 may include a plurality of items 106. In this regard, for the items 106 that include cases, the cases may include information such as case identification, a time associated with a case, a case title, etc. For the cases from the dataset 104, certain information may be utilized for clustering purposes as disclosed herein. The cases that include this information may be specified as slim cases that include information such as case identification, and case title.

At 400, cases that fall within a certain window (e.g., 30 to 60 days, or another specified time-frame) may be identified for clustering purposes.

The cases identified at 400 may be processed, for example, by tokenizing and normalization at 402, and feature extraction at 404. With respect to feature extraction, data for the cases may be converted from text to vectors for clustering.

Thereafter, as disclosed herein with respect to clustering, the dataset sampling module 102 may randomly sample the cases from block 404 to identify the specified number of sampled cases. The remaining analysis with respect to clustering of the sampled cases and clustering of the un-sampled cases may be performed as disclosed herein with respect to FIGS. 1 and 2.

At 406, the clusters 112 including the topics may be stored. When a user selects a topic and/or associated cases for display at the user interface 408, the integrated information that includes all of the details of the cases may be received from block 410 for display at the user interface 408. Examples of the displayed information are disclosed herein with respect to FIGS. 5-9.

Figure 5:
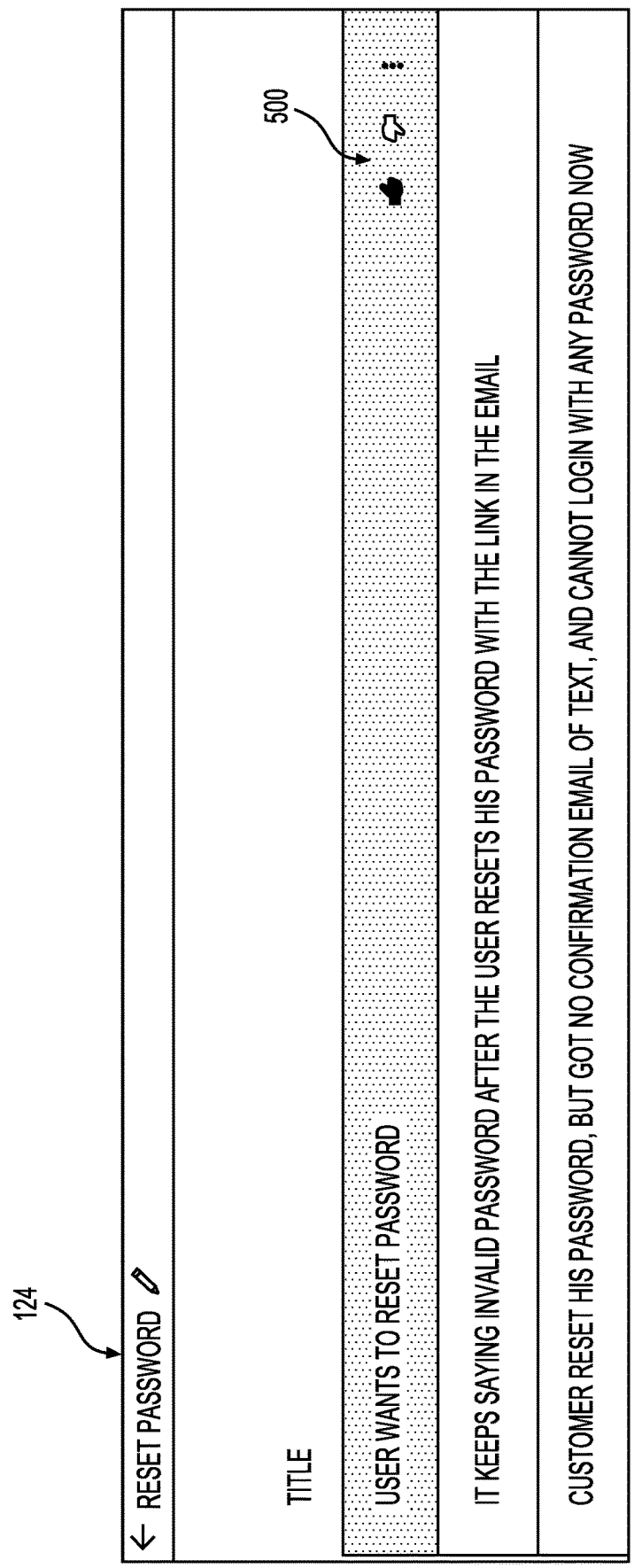
FIG. 5 illustrates feedback with respect to a generated topic to illustrate operation of the iterative sampling based dataset clustering apparatus of FIG. 1 in accordance with an embodiment of the present disclosure.

FIG. 5 illustrates feedback with respect to a generated topic to illustrate operation of the apparatus 100 in accordance with an embodiment of the present disclosure.

Referring to FIG. 5, as disclosed herein, the topic generation module 122 may generate a topic 124 for each of the generated clusters. In this regard, FIG. 5 illustrates items (e.g., cases) that are assigned to a cluster for the topic "reset password". The cluster may include items such as "user wants to reset password", etc. A user may provide feedback (e.g., at 500, by selecting a "thumbs-up" or "thumbs-down" symbol) to indicate whether the item provides appropriate information for the topic, etc.

Figure 6:
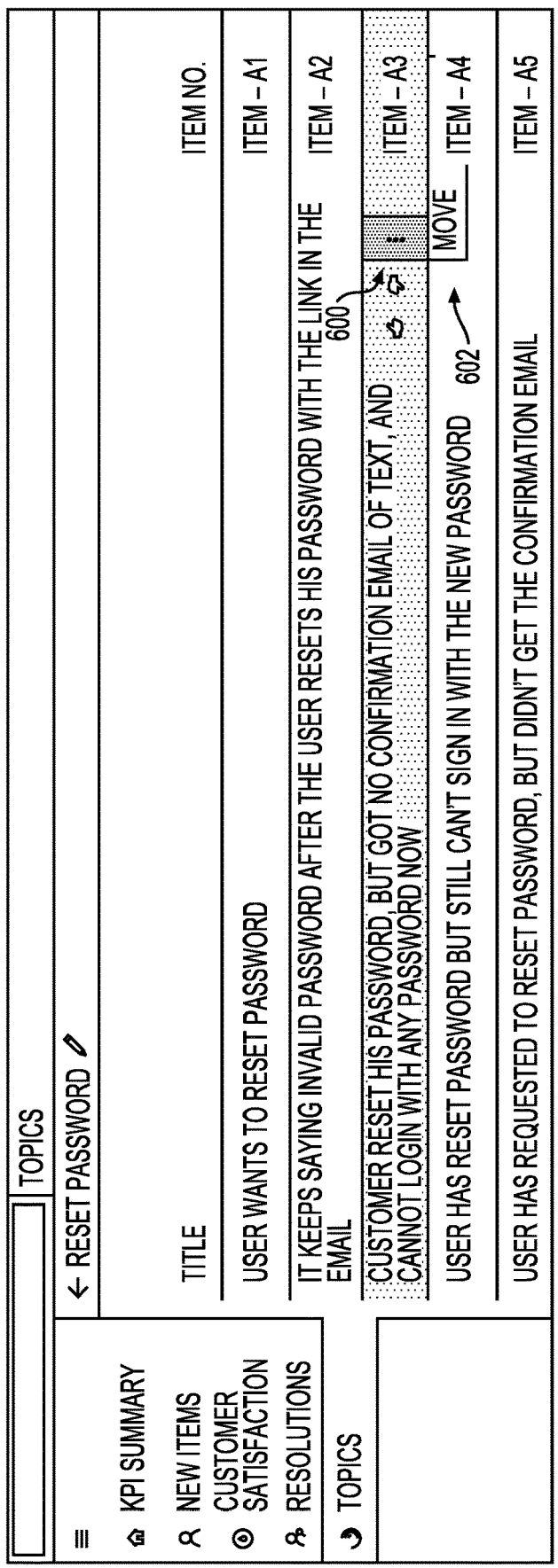
FIG. 6 illustrates selection of an item to be moved from one topic to another topic to illustrate operation of the iterative sampling based dataset clustering apparatus of FIG. 1 in accordance with an embodiment of the present disclosure.

FIG. 6 illustrates selection of an item to be moved from one topic to another topic to illustrate operation of the apparatus 100 in accordance with an embodiment of the present disclosure.

Referring to FIG. 6, in order to move an item from one topic to another topic, a user may select an item (e.g., at 600), and may further select a "move" option (e.g., at 602) for the selected item.

Figure 7:
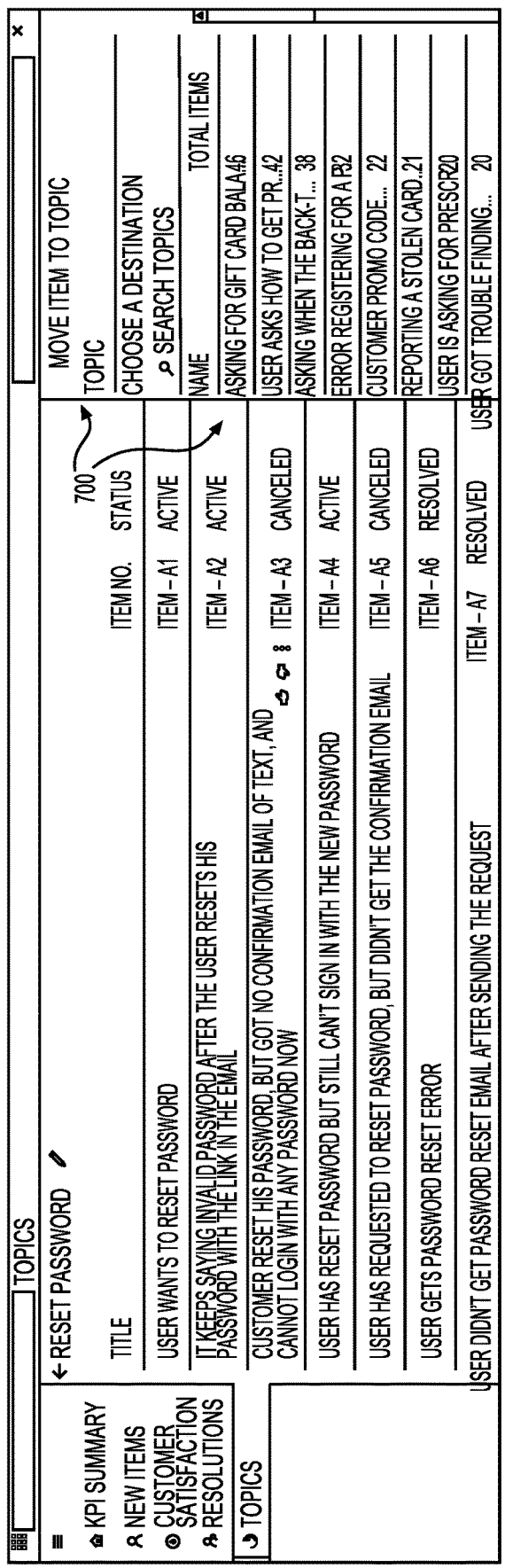
FIG. 7 illustrates movement of a selected item from one topic to another to topic illustrate operation of the iterative sampling based dataset clustering apparatus of FIG. 1 in accordance with an embodiment of the present disclosure.

FIG. 7 illustrates movement of a selected item from one topic to another topic to illustrate operation of the apparatus 100 in accordance with an embodiment of the present disclosure.

Referring to FIG. 7, the item selected at 600 may be moved to a new topic (e.g., one of the topics 700).

Figure 8:
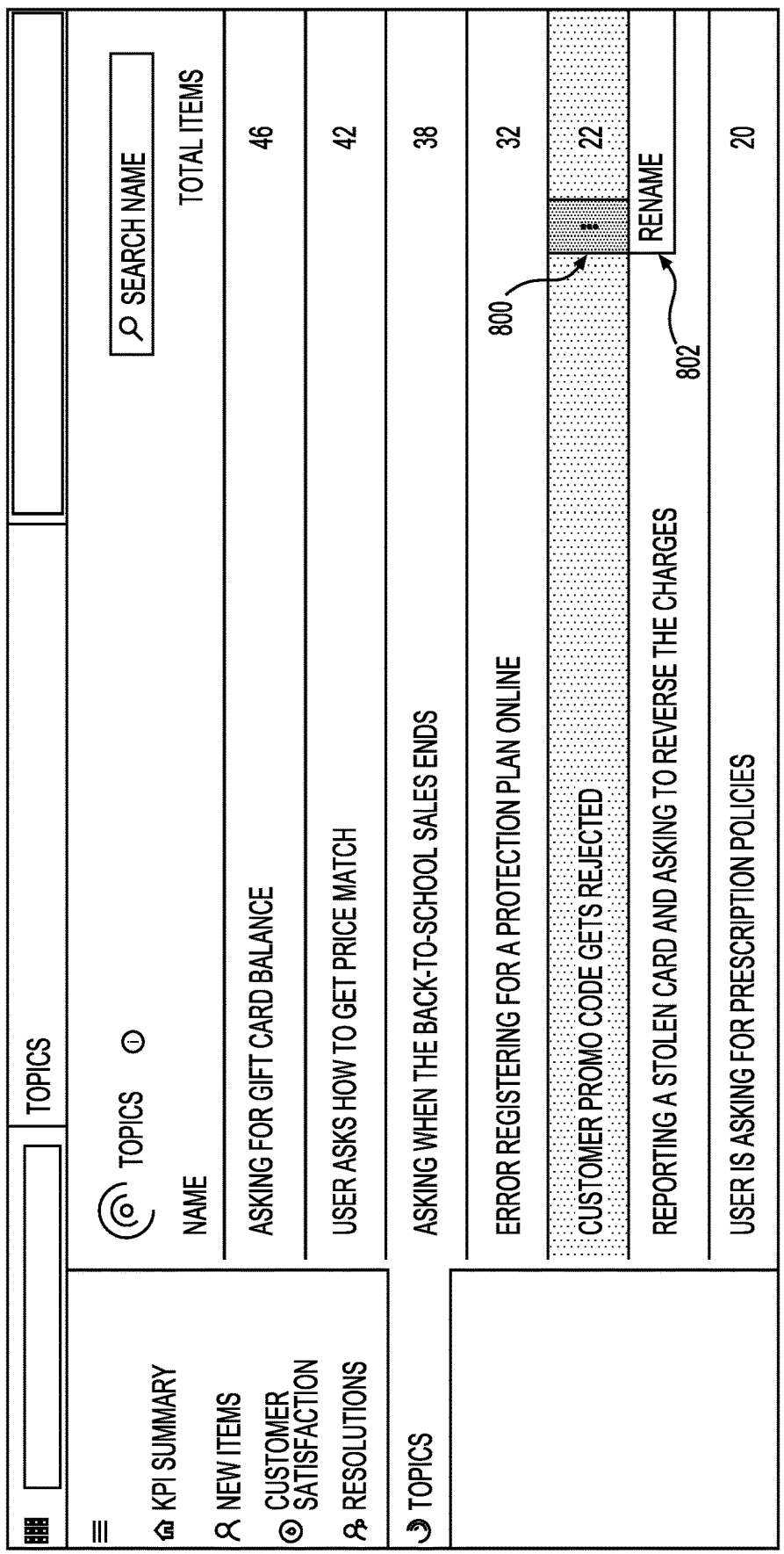
FIG. 8 illustrates selection of a topic to be renamed to illustrate operation of the iterative sampling based dataset clustering apparatus of FIG. 1 in accordance with an embodiment of the present disclosure.

FIG. 8 illustrates selection of a topic to be renamed to illustrate operation of the apparatus 100 in accordance with an embodiment of the present disclosure.

Referring to FIG. 8, in order to rename a topic, a user may select a topic (e.g., at 800), and may further select a "rename" option (e.g., at 802) for the selected topic.

Figure 9:
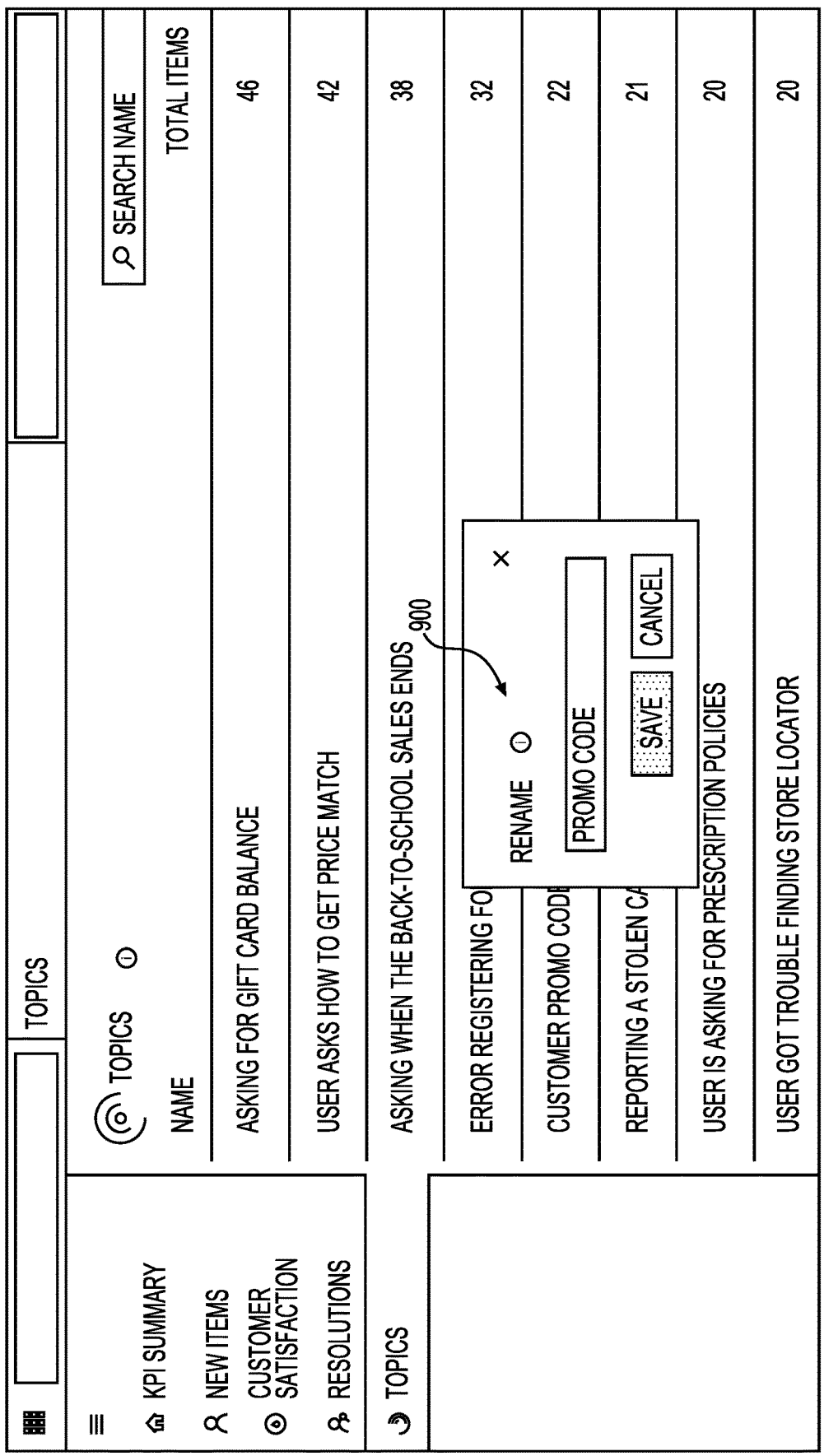
FIG. 9 illustrates renaming of a selected topic to illustrate operation of the iterative sampling based dataset clustering apparatus of FIG. 1 in accordance with an embodiment of the present disclosure.

FIG. 9 illustrates renaming of a selected topic to illustrate operation of the apparatus 100 in accordance with an embodiment of the present disclosure.

Referring to FIG. 9, the topic selected at 800 may be renamed at 900 (e.g., from "customer promo code gets rejected" to "promo code").

FIGS. 10A-10D illustrate transfer of topics to illustrate operation of the apparatus 100 in accordance with an embodiment of the present disclosure.

With respect to transfer of a topic from an original cluster to a new cluster, when items for a new dataset are analyzed to generate new clusters, a new cluster may include items that are somewhat similar to items of an original cluster. In this regard, the topic transfer module 126 may transfer a topic from an original cluster to a new cluster based on an analysis of a number of intersected points between the original cluster and the new cluster. For example, if an intersection over union associated with the number of intersected points between the original cluster and the new cluster exceeds the specified topic threshold 128, then the topic of the original cluster may be transferred to the new cluster, and otherwise the two clusters may be assigned different topics.

In order to determine whether to transfer a topic from an original cluster to a new cluster, or to assign the original cluster and the new cluster different topics, the topic transfer module 126 may identify similar cluster pairs that include an original cluster and a new cluster. The topic transfer module 126 may sort the cluster pairs by descending similarity, and start with a most similar cluster pair. For the most similar cluster pair, the topic transfer module 126 may count a number of intersected points (e.g., items) between the pair of clusters using the clusters' original observations and based on a distance threshold. For example, on a scale of 0-1, a value of zero may represent a highest distance and a value of one may represent a lowest distance, where a distance threshold (e.g., the topic threshold 128) may be specified, for example, as 0.5. In this regard, if an intersection over union based on the intersected points exceeds the specified topic threshold 128, the topic transfer module 126 may transfer the topic of the original cluster from the cluster pair to the new cluster, and otherwise, the new cluster and the original cluster may be assigned different topics. If an original cluster name is transferred to a new cluster, all remaining pairs of clusters related to these clusters may not be further considered. If an original cluster is not inherited by a new cluster for a specified time period, the original cluster may be removed from the set of clusters.

Figure 10A:
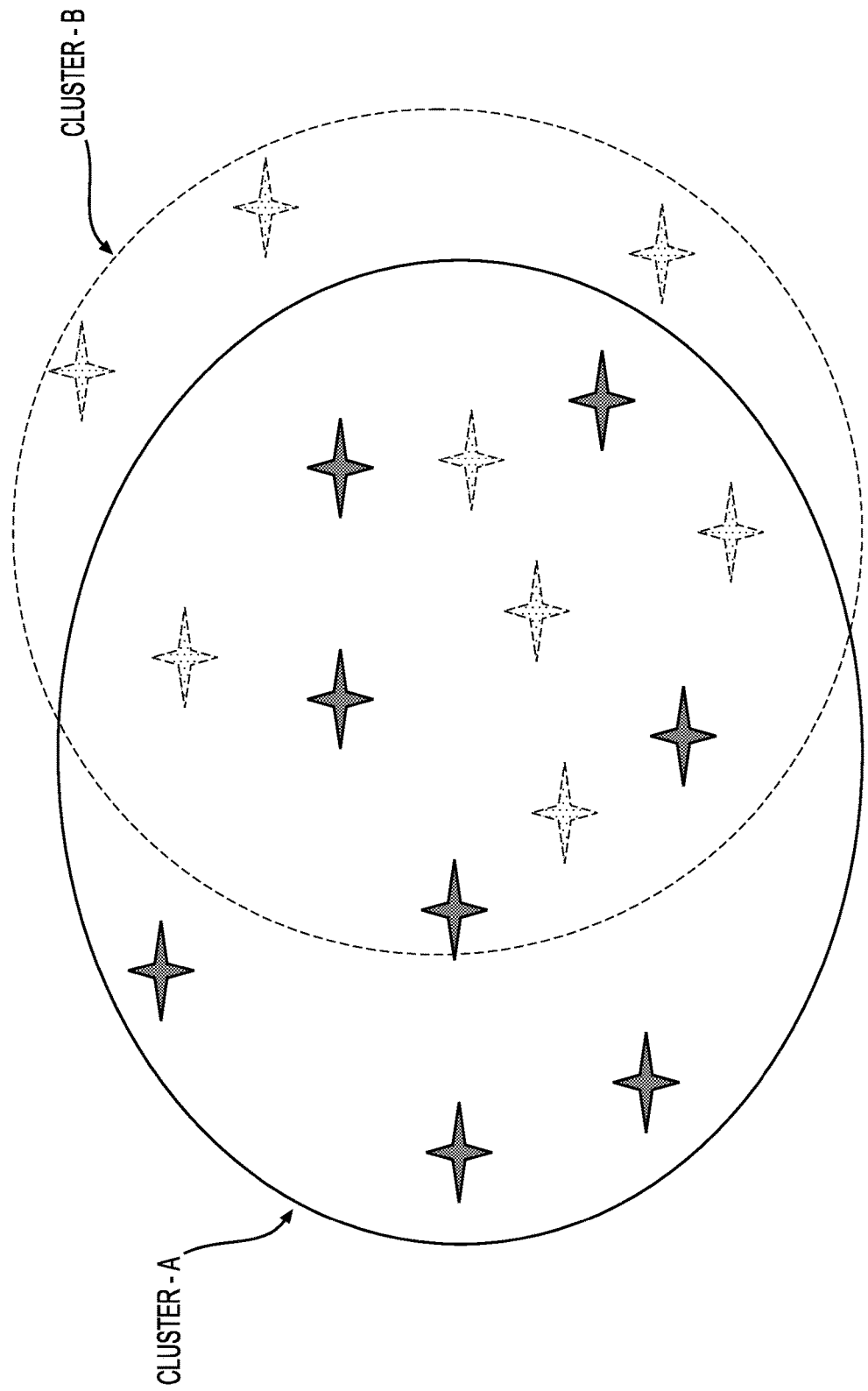

For example, referring to FIG. 10A, cluster-A may represent the original cluster and cluster-B may represent the new cluster. The topic transfer module 126 may count a number of intersected points (e.g., 10 intersected points) between cluster-A and cluster-B. The points may represent items. If an intersection over union (e.g., 10/16, where 16 represents the union of the two clusters) based on the intersected points exceeds a specified topic threshold 128 (e.g., 0.5), the topic transfer module 126 may transfer the topic of the original cluster from the cluster pair to the new cluster. For the example of FIG. 10A, since 10/16 is greater than 0.5, the topic transfer module 126 may transfer the topic of cluster-A to cluster-B. Since cluster-A pertains to "older" data, cluster-A may be removed, and cluster-B may be assigned the topic and identification of cluster-A.

Figure 10B:
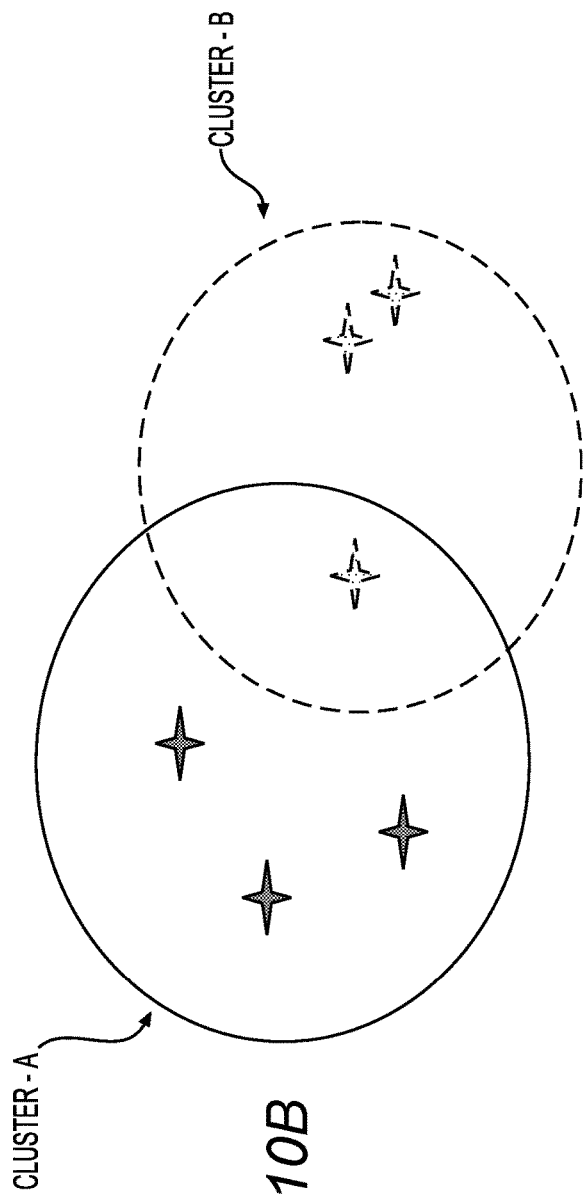

Referring to FIG. 10B, since an intersection over union of 1/6 for cluster-A and cluster-B may be less than the specified topic threshold 128 (e.g., 0.5), the topic transfer module 126 may not transfer the topic of cluster-A to cluster-B. In this regard, cluster-B may be assigned a new name. Further, since cluster-A pertains to "older" data, cluster-A may be removed, and cluster-B may be utilized with the newly assigned name.

Figure 10C:
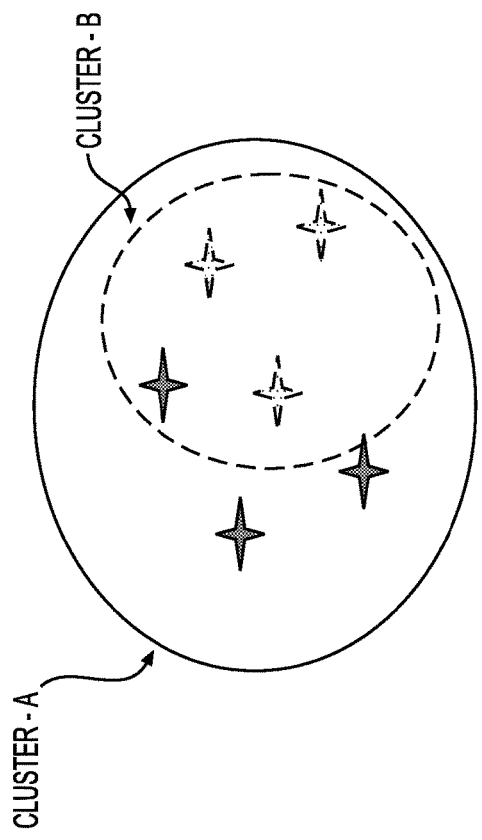

Referring to FIG. 10C, since an intersection over union of 4/6 may be greater than the specified topic threshold 128 (e.g., 0.5), the topic transfer module 126 may transfer the topic of cluster-A to cluster-B. In this regard, based on the transfer of the topic of cluster-A to cluster-B, since cluster-A pertains to "older" data, cluster-A may be removed, and cluster-B may be assigned the topic and identification of cluster-A.

Referring to FIG. 10D, since an intersection over union of 5/8 may be greater than the specified topic threshold 128 (e.g., 0.5), the topic transfer module 126 may transfer the topic of cluster-A to cluster-B. In this regard, based on the transfer of the topic of cluster-A to cluster-B, since cluster-A pertains to "older" data, cluster-A may be removed, and cluster-B may be assigned the topic and identification of cluster-A.

Referring to FIG. 10E, for cluster-A and cluster-B, an intersection over union may be determined to be 3/10, and for cluster-A and cluster-C, an intersection over union may be determined to be 6/13. In both cases, since the intersection over union for both sets of clusters is less than the specified topic threshold 128 (e.g., 0.5), the topic transfer module 126 may not transfer the topic of cluster-A to cluster-B or cluster-C. In case the intersection over union is above the threshold for both cluster sets, the transfer may be performed only with the cluster set that includes the highest intersection over union.

Figure 11A:
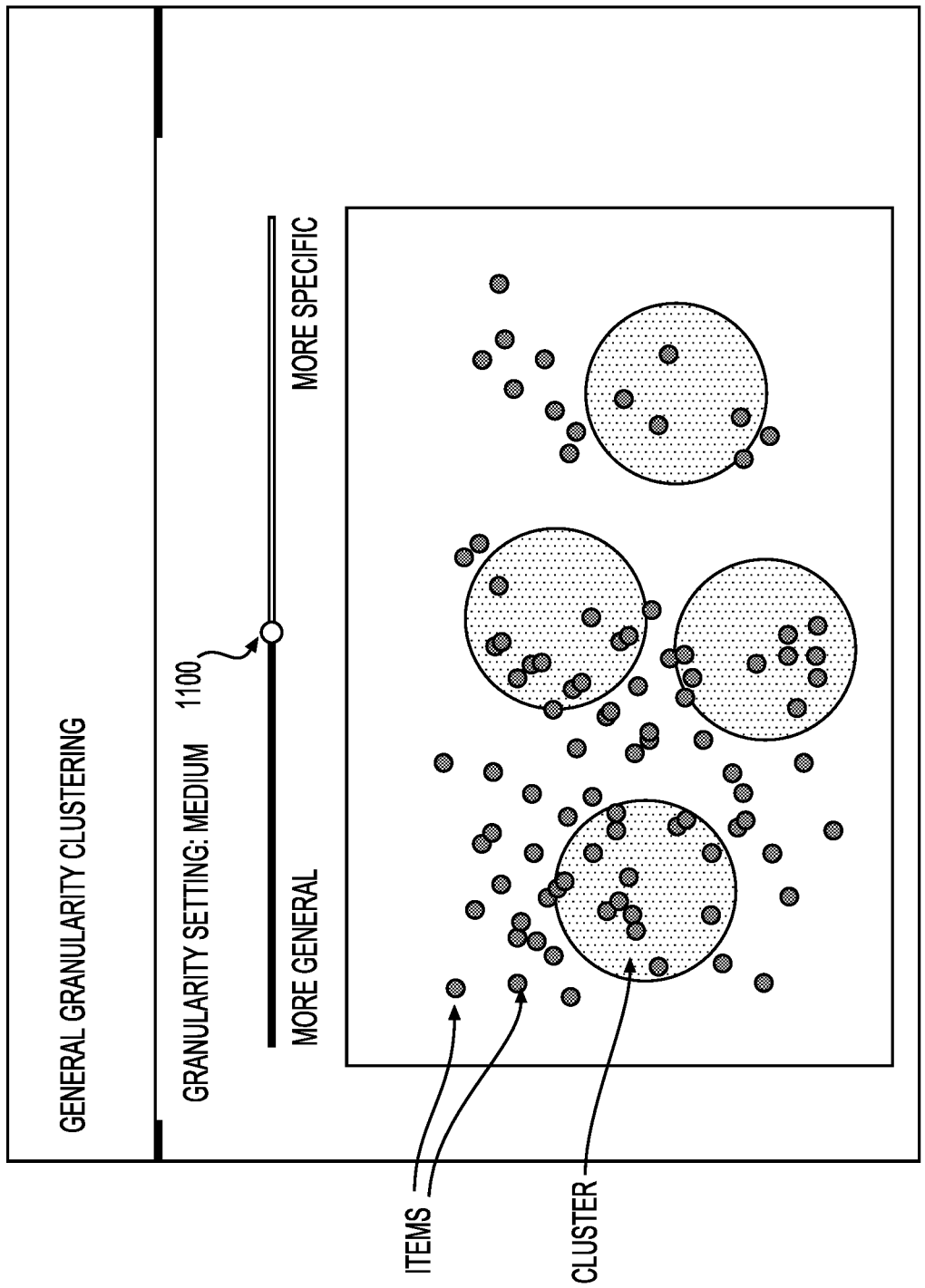
Figure 11C:
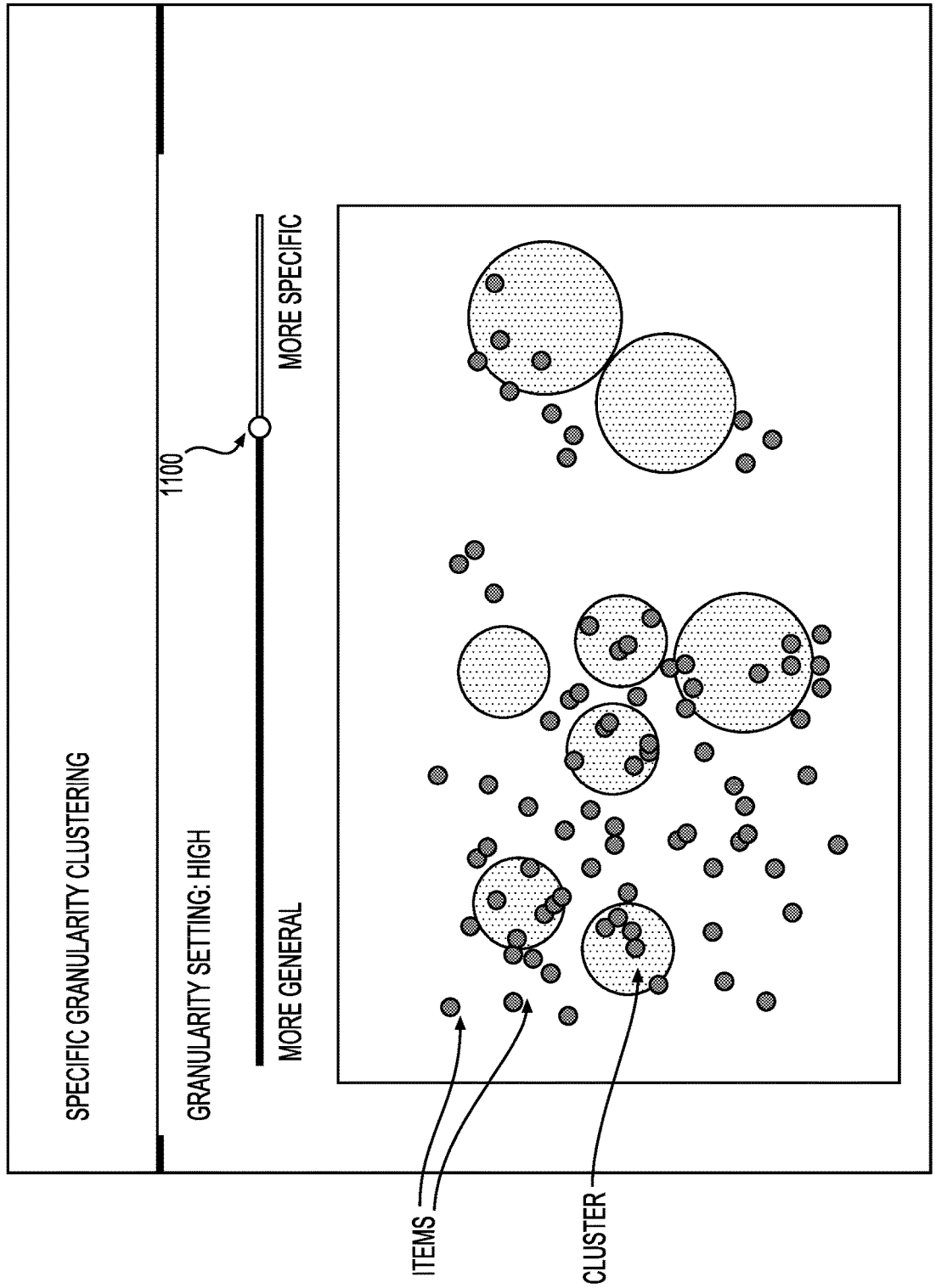

FIGS. 11A-11C illustrate clustering granularity selection to illustrate operation of the apparatus 100 in accordance with an embodiment of the present disclosure.

The clustering module 110 may provide for specification of a clustering granularity. For example, a clustering granularity may be specified between a range of 0-1, where 0 represents a more general clustering granularity, and 1 represents a more specific clustering granularity. For example, FIG. 11A shows clusters that are generated at a medium clustering granularity (e.g., 0.5). Further, FIG. 11B shows clusters that are generated at a high clustering granularity (e.g., 0.7) compared to FIG. 11A, and FIG. 11C shows clusters that are generated at an even higher clustering granularity (e.g., 0.8). Thus, by operating a slider at 1100, a user may increase or decrease a clustering granularity. For example, the granularity setting may be translated to a space between 0 and 1, and then further transferred into a space between minimum and maximum workable similarity thresholds. The similarity thresholds may be used in a clustering process, such as the Density-based spatial clustering of applications with noise (DBSCAN) clustering process.

Figure 12:
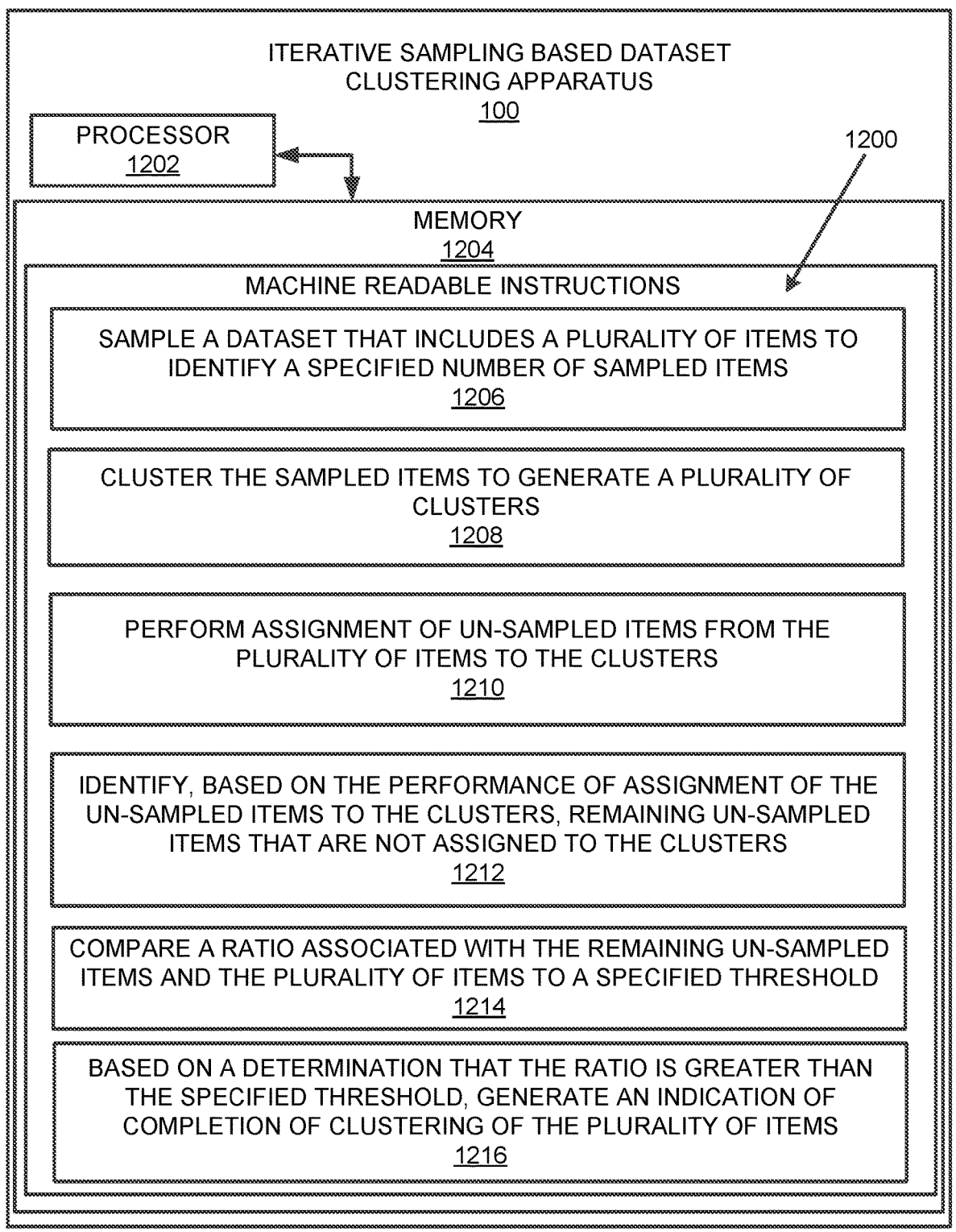
FIG. 12 illustrates an example block diagram for iterative sampling based dataset clustering in accordance with an embodiment of the present disclosure.
Figure 14:
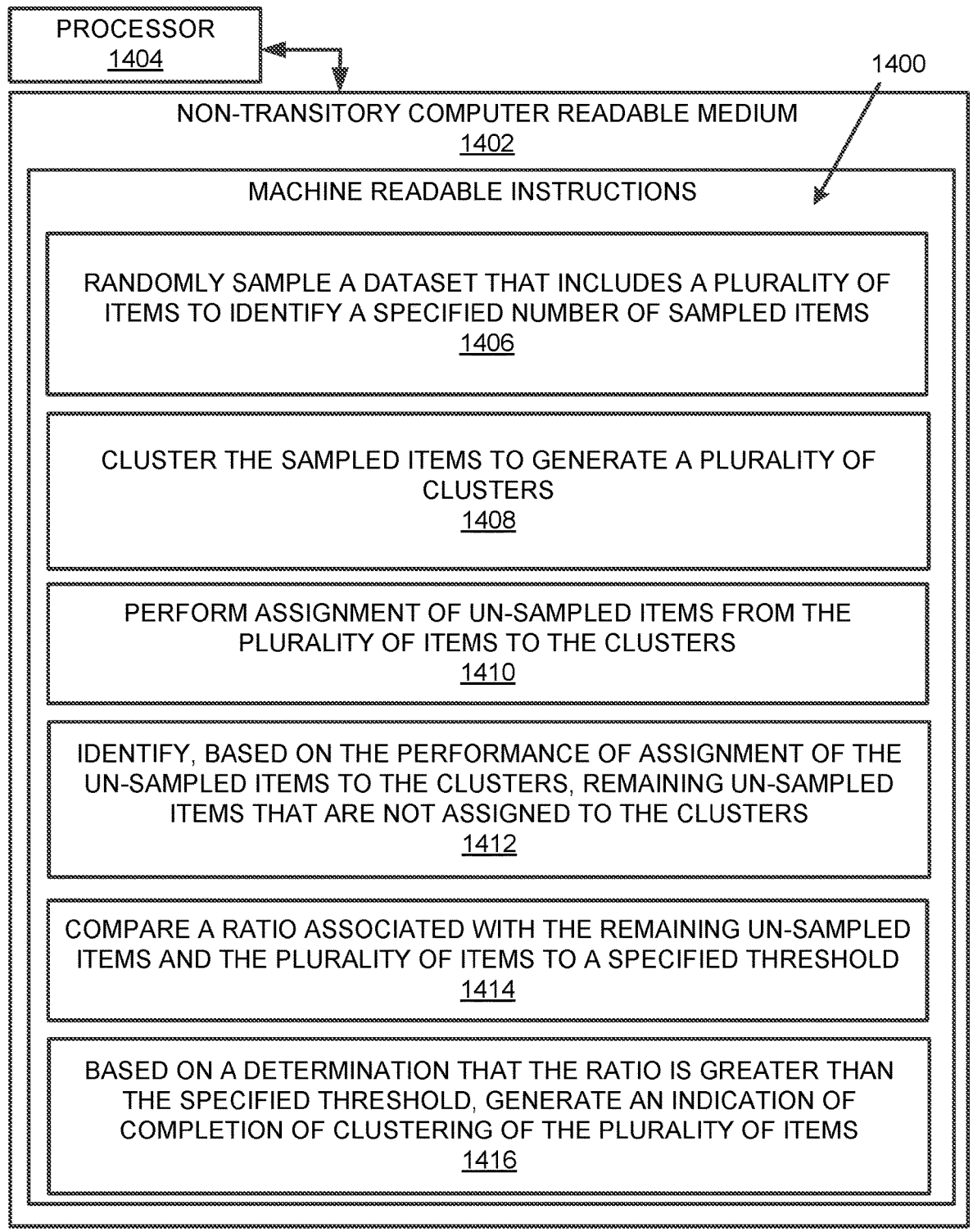
FIG. 14 illustrates a further example block diagram for iterative sampling based dataset clustering in accordance with another embodiment of the present disclosure.

FIGS. 12-14 respectively illustrate an example block diagram 1200, a flowchart of an example method 1300, and a further example block diagram 1400 for iterative sampling based dataset clustering, according to examples. The block diagram 1200, the method 1300, and the block diagram 1400 may be implemented on the apparatus 100 described above with reference to FIG. 1 by way of example and not of limitation. The block diagram 1200, the method 1300, and the block diagram 1400 may be practiced in other apparatus. In addition to showing the block diagram 1200, FIG. 12 shows hardware of the apparatus 100 that may execute the instructions of the block diagram 1200. The hardware may include a processor 1202, and a memory 1204 storing machine readable instructions that when executed by the processor cause the processor to perform the instructions of the block diagram 1200. The memory 1204 may represent a non-transitory computer readable medium. FIG. 13 may represent an example method for iterative sampling based dataset clustering, and the steps of the method. FIG. 14 may represent a non-transitory computer readable medium 1402 having stored thereon machine readable instructions to provide iterative sampling based dataset clustering according to an example. The machine readable instructions, when executed, cause a processor 1404 to perform the instructions of the block diagram 1400 also shown in FIG. 14.

The processor 1202 of FIG. 12 and/or the processor 1404 of FIG. 14 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1402 of FIG. 14), such as hardware storage devices (e.g., RAM (random access memory), ROM (read only memory), EPROM (erasable, programmable ROM), EEPROM (electrically erasable, programmable ROM), hard drives, and flash memory). The memory 1204 may include a RAM, where the machine readable instructions and data for a processor may reside during runtime.

Referring to FIGS. 1-12, and particularly to the block diagram 1200 shown in FIG. 12, the memory 1204 may include instructions 1206 to sample a dataset 104 that includes a plurality of items 106 to identify a specified number of sampled items 108.

The processor 1202 may fetch, decode, and execute the instructions 1208 to cluster the sampled items 108 to generate a plurality of clusters 112.

The processor 1202 may fetch, decode, and execute the instructions 1210 to perform assignment of un-sampled items from the plurality of items 106 to the clusters 112.

The processor 1202 may fetch, decode, and execute the instructions 1212 to identify, based on the performance of assignment of the un-sampled items to the clusters 112, remaining un-sampled items that are not assigned to the clusters 112.

The processor 1202 may fetch, decode, and execute the instructions 1214 to compare a ratio 118 associated with the remaining un-sampled items and the plurality of items 106 to a specified clustering threshold 120.

Based on a determination that the ratio 118 is greater than the specified clustering threshold 120, the processor 1202 may fetch, decode, and execute the instructions 1216 to generate an indication of completion of clustering of the plurality of items 106.

Referring to FIGS. 1-11C and 13, and particularly FIG. 13, for the method 1300, at block 1302, the method may include sampling a dataset 104 that includes a plurality of items 106 to identify a specified number of sampled items 108.

At block 1304, the method may include clustering the sampled items 108 to generate a plurality of clusters 112.

At block 1306, the method may include performing assignment of un-sampled items from the plurality of items 106 to the clusters 112.

At block 1308, the method may include identifying, based on the performance of assignment of the un-sampled items to the clusters 112, remaining un-sampled items that are not assigned to the clusters 112.

At block 1310, the method may include comparing a ratio 118 associated with the remaining un-sampled items and the plurality of items 106 to a specified clustering threshold 120.

Based on a determination that the ratio 118 is less than or equal to the specified clustering threshold 120, at block 1312, the method may include further sampling the remaining un-sampled items to identify a further specified number of sampled items.

At block 1314, the method may include clustering the further sampled items to generate a further plurality of clusters.

Referring to FIGS. 1-11C and 14, and particularly FIG. 14, for the block diagram 1400, the non-transitory computer readable medium 1402 may include instructions 1406 to randomly sample a dataset that includes a plurality of items 106 to identify a specified number of sampled items 108.

The processor 1404 may fetch, decode, and execute the instructions 1408 to cluster the sampled items 108 to generate a plurality of clusters 112.

The processor 1404 may fetch, decode, and execute the instructions 1410 to perform assignment of un-sampled items from the plurality of items 106 to the clusters 112.

The processor 1404 may fetch, decode, and execute the instructions 1412 to identify, based on the performance of assignment of the un-sampled items to the clusters 112, remaining un-sampled items that are not assigned to the clusters 112.

The processor 1404 may fetch, decode, and execute the instructions 1414 to compare a ratio associated with the remaining un-sampled items and the plurality of items to a specified threshold.

Based on a determination that the ratio 118 is greater than the specified clustering threshold 120, the processor 1404 may fetch, decode, and execute the instructions 1416 to generate an indication of completion of clustering of the plurality of items 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a computer readable medium on which is stored machine readable instructions that cause the processor to cluster a plurality of items in a dataset, including instructions that cause the processor to:
   sample a specified number of items from the plurality of items in the dataset;
   cluster the sampled items into a plurality of clusters based on a specified clustering granularity;
   identify a topic for each cluster of the plurality of clusters;
   assign a number of un-sampled items from the dataset to the plurality of clusters based on the topics of the plurality of clusters, wherein the number of the un-sampled items assigned to the plurality of clusters is less than all of the un-sampled items in the dataset;
   following the assignment of the number of the un-sampled items from the dataset to the plurality of clusters, determine a remaining number of the un-sampled items in the dataset that are not assigned to any clusters;
   determine a unsampled to total ratio that is based on the remaining number of the un-sampled items in the dataset that are not assigned to any clusters over a total number of the plurality of items in the dataset;
   compare the unsampled to total ratio to a specified clustering threshold, wherein the specified clustering threshold indicates a desired percentage of items indicating a percentage of items that are to be clustered;
   based on a determination that the unsampled to total ratio is greater than the specified clustering threshold, generate an indication that clustering of the plurality of items in the dataset is complete; or
   based on a determination that the unsampled to total ratio is less than or equal to the specified clustering threshold, repeat the sampling of items from the dataset, the clustering, the assigning, the determining of the remaining number of the un-sampled items in the dataset that are not assigned to any clusters, and the determining of the unsampled to total ratio until the unsampled to total ratio is greater than the specified clustering threshold.

2. The apparatus according to claim 1, wherein, to sample the specified number of items from the plurality of items in the dataset, the instructions further cause the processor to:
   randomly sample the specified number of items from the plurality of items in the dataset.

3. The apparatus according to claim 1, wherein, to determine the unsampled to total ratio, the instructions further cause the processor to:
   determine a value by subtracting the remaining number of the un-sampled items in the dataset that are not assigned to any clusters from the total number of the plurality of items in the dataset, and
   divide the determined value by the total number of the plurality of items in the dataset to obtain the unsampled to total ratio.

4. The apparatus according to claim 1, wherein the instructions further cause the processor to:
   based on a determination that the unsampled to total ratio is less than or equal to the specified clustering threshold, further sample a further specified number of the un-sampled items remaining in the dataset; and
   cluster the further sampled items to generate a further plurality of clusters.

5. The apparatus according to claim 4, wherein the instructions further cause the processor to:
   for each further cluster of the further plurality of clusters, compare the plurality of clusters to the further cluster to identify one of the plurality of clusters that is most similar to the further cluster;
   count a number of intersected points between the further cluster and the most similar cluster; and
   in response to the number of intersected points exceeding a topic threshold, transfer the topic of the most similar cluster to the further cluster.

6. The apparatus according to claim 1, wherein, to identify the topic for each cluster of the plurality of clusters, the instructions further clause the processor to:
   for each cluster of the plurality of clusters, separate each item assigned to the cluster into sentences;
   for each sentence, identify noun phrases;
   rank the noun phrases according to a term frequency measure;
   identify, from the ranked noun phrases, a specified number of highest ranked noun phrases; and
   utilize the highest ranked noun phrases with a deep neural network model to identify the topic of the cluster.

7. The apparatus according to claim 1, wherein the specified clustering granularity comprises a value between 0, representing a more general clustering granularity, and 1, representing a more specific clustering granularity.

8. The apparatus according to claim 1, including further instructions that cause the processor to:
   before sampling a specified number of items from the plurality of items in the dataset, reduce the dataset to cases that fall within a specified window to generate a slimmed plurality of items in the dataset.

9. A computer-implemented method comprising:
   sampling, by a processor, a specified number of items from a plurality of items in a dataset;
   clustering, by the processor, the sampled items into a plurality of clusters, based on a specified clustering granularity;
   identifying, by the processor, a topic for each cluster of the plurality of clusters;
   assigning, by the processor, a number of un-sampled items from the dataset to the plurality of clusters based on the topics of the plurality of clusters, wherein the number of the un-sampled items assigned to the plurality of clusters is less than all of the un-sampled items in the dataset;

following the assignment of the number of the un-sampled items from the dataset to the clusters, determining, by the processor, a remaining number of the un-sampled items in the dataset that are not assigned to any clusters;

determining, by the processor, a unsampled to total ratio that is based on the remaining number of the un-sampled items in the dataset that are not assigned to any clusters over a total number of the plurality of items in the dataset;

comparing, by the processor, the unsampled to total ratio to a specified clustering threshold, wherein the specified clustering threshold indicates a desired percentage of items indicating a percentage of items that are to be clustered;

based on a determination that the unsampled to total ratio is greater than the specified clustering threshold, generating, by the processor, an indication that clustering of the plurality of items in the dataset is complete; or based on a determination that the unsampled to total ratio is less than or equal to the specified clustering threshold, repeating, by the processor, the sampling of items from the dataset, the clustering, the assigning, the determining of the remaining number of the un-sampled items in the dataset that are not assigned to any clusters, and the determining of the unsampled to total ratio until the unsampled to total ratio is greater than the specified clustering threshold.

10. The computer-implemented method according to claim 9, further comprising:

based on a determination that the unsampled to total ratio is less than or equal to the specified threshold, sampling a further specified number of the un-sampled items remaining in the dataset; and clustering the further sampled items to generate a further plurality of clusters.

11. The computer-implemented method according to claim 10, further comprising:

for each further cluster of the plurality of clusters, comparing the plurality of clusters to the further cluster to identify one of the plurality of clusters that is most similar to the further cluster;

counting a number of intersected points between the further cluster and the most similar cluster; and in response to the number of intersected points exceeding a topic threshold, transferring the topic of the most similar cluster to the further cluster.

12. The computer-implemented method according to claim 9, wherein sampling, by the processor, the specified number of items from the plurality of items in the dataset comprises:

randomly sampling the specified number of items from the plurality of items in the dataset.

13. The computer-implemented method according to claim 9, wherein determining the unsampled to total ratio comprises:

determining a value by subtracting the remaining number of the un-sampled items in the dataset that are not assigned to any clusters from the total number of the plurality of items in the dataset, and dividing the determined value by the total number of the plurality of items in the dataset to obtain the unsampled to total ratio.

14. The computer-implemented method according to claim 9, identifying the topic for each cluster of the plurality of clusters comprises:

for each cluster of the plurality of clusters, separating each item assigned to the cluster into sentences;

for each sentence, identifying noun phrases;

ranking the noun phrases according to a term frequency measure;

identifying, from the ranked noun phrases, a specified number of highest ranked noun phrases; and utilizing the highest ranked noun phrases with a deep neural network model to identify the topic of the cluster.

15. One or more hardware storage devices that store instructions that are executable by one or more processors to cause the one or more processors to:

sample a specified number of items from the plurality of items in the dataset;

cluster the sampled items into a plurality of clusters, based on a specified clustering granularity;

identify a topic for each cluster in the plurality of clusters;

assign a number of un-sampled items from the dataset to the plurality of clusters based on the topics of the plurality of clusters, wherein the number of the un-sampled items assigned to the plurality of clusters is less than all of the un-sampled items in the dataset;

following the assignment of the number of the un-sampled items from the dataset to the plurality of clusters, determine a remaining number of the un-sampled items in the dataset that are not assigned to any clusters;

determine a unsampled to total ratio that is based on the remaining number of the un-sampled items in the dataset that are not assigned to any clusters over a total number of the plurality of items in the dataset;

compare the ratio to a specified clustering threshold, wherein the specified clustering threshold indicates a desired percentage of items indicating a percentage of items that are to be clustered;

based on a determination that the unsampled to total ratio is greater than the specified clustering threshold, generate an indication that clustering of the plurality of items in the dataset is complete; or based on a determination that the unsampled to total ratio is less than or equal to the specified clustering threshold, repeat the sampling of items from the dataset, the clustering, the assigning, the determining of the remaining number of the un-sampled items in the dataset that are not assigned to any clusters, and the determining of the unsampled to total ratio until the unsampled to total ratio is greater than the specified clustering threshold.

16. The one or more hardware storage devices of claim 15, wherein, to determine the unsampled to total ratio, the instructions further cause the processor to:

determine a value by subtracting the remaining number of the un-sampled items in the dataset that are not assigned to any clusters from the total number of the plurality of items in the dataset, and divide the determined value by the total number of the plurality of items in the dataset to obtain the unsampled to total ratio.

17. The one or more hardware storage devices of claim 15, wherein the instructions further cause the processor to:

based on a determination that the unsampled to total ratio is less than or equal to the specified threshold, sample a further specified number of the un-sampled items remaining in the dataset; and cluster the further sampled items to generate a further plurality of clusters.

18. The one or more hardware storage devices of claim 17, wherein the instructions further cause the processor to:
- for each further cluster of the further plurality of clusters, compare the plurality of clusters to the further cluster to identify one of the plurality of clusters that is most similar to the further cluster;
- count a number of intersected points between the further cluster and the most similar cluster; and
- in response to the number of intersected points exceeding a topic threshold, transfer the topic of the most similar cluster to the further cluster.

\* \* \* \* \*